United States Patent
Chandhoke et al.

(10) Patent No.: US 8,239,177 B2
(45) Date of Patent: Aug. 7, 2012

(54) SIMULATION OF A MOTION SYSTEM INCLUDING A MECHANICAL MODELER WITH INTERPOLATION

(75) Inventors: Sundeep Chandhoke, Austin, TX (US); Brian C. MacCleery, Austin, TX (US)

(73) Assignee: National Instruments Corporation, Austin, TX (US)

( * ) Notice: Subject to any disclaimer, the term of this patent is extended or adjusted under 35 U.S.C. 154(b) by 522 days.

(21) Appl. No.: 12/466,437

(22) Filed: May 15, 2009

(65) Prior Publication Data

US 2010/0030539 A1  Feb. 4, 2010

Related U.S. Application Data

(60) Provisional application No. 61/085,721, filed on Aug. 1, 2008.

(51) Int. Cl.
*G06F 17/50* (2006.01)
*G06F 3/048* (2006.01)

(52) U.S. Cl. ............... 703/2; 703/14; 703/22; 700/117; 700/95; 715/771; 715/772

(58) Field of Classification Search ............. 703/2, 14, 703/22; 700/117, 95; 715/772, 771
See application file for complete search history.

(56) References Cited

U.S. PATENT DOCUMENTS

| | | | |
|---|---|---|---|
| 4,603,284 A | 7/1986 | Perzley | |
| 4,914,568 A | 4/1990 | Kodosky et al. | |
| 5,569,994 A | 10/1996 | Taylor et al. | |
| 5,594,856 A * | 1/1997 | Girard | 345/473 |
| 5,731,821 A * | 3/1998 | Girard | 345/474 |
| 5,793,382 A * | 8/1998 | Yerazunis et al. | 345/474 |
| 6,683,968 B1* | 1/2004 | Pavlovic et al. | 382/103 |
| 6,826,519 B1 | 11/2004 | Fujino | |
| 6,865,441 B2 | 3/2005 | Chandhoke | |
| 7,024,666 B1 | 4/2006 | Brown | |
| 7,092,860 B1 | 8/2006 | Wasserman | |
| 7,103,424 B2 | 9/2006 | Chandhoke | |
| 7,253,579 B2 | 8/2007 | Vau | |
| 7,260,560 B2 | 8/2007 | Herbrich et al. | |
| 7,278,316 B2 | 10/2007 | Satou et al. | |
| 7,568,198 B2 | 7/2009 | Chandhoke | |
| 7,953,513 B2* | 5/2011 | Bhat et al. | 700/197 |
| 2002/0191023 A1 | 12/2002 | Chandhoke et al. | |
| 2006/0064183 A1 | 3/2006 | Chandhoke | |
| 2006/0212161 A1* | 9/2006 | Bhat et al. | 700/197 |
| 2009/0144647 A1* | 6/2009 | Chandhoke | 715/772 |

* cited by examiner

*Primary Examiner* — Thai Phan

(74) *Attorney, Agent, or Firm* — Meyertons Hood Kivlin Kowert & Goetzel, P.C.; Jeffrey C. Hood; Joel L. Stevens (57) ABSTRACT

Simulating a mechanical system controlled by a motion controller. First position data may be received. The first position data may be provided by a motion controller at a first rate. The first position data received at the first rate may be interpolated to provide second position data at a second rate. Operation of the mechanical system may be simulated or modeled using the second position data at the second rate. Interpolating the first position data and modeling the operation of the mechanical system may be performed without simulating drives and motors necessary to drive the mechanical system.

20 Claims, 5 Drawing Sheets

SIMULATION OF A MOTION SYSTEM INCLUDING A MECHANICAL MODELER WITH INTERPOLATION

PRIORITY

This application claims benefit of priority of U.S. provisional application Ser. No. 61/085,721 titled "Simulation of a Motion System Including a Mechanical Modeler with Interpolation" filed Aug. 1, 2008, whose inventors were Sundeep Chandhoke and Brian C. MacCleery and which is hereby incorporated by reference in its entirety as though fully and completely set forth herein.

FIELD OF THE INVENTION

The present invention relates to the field of motion control and simulation, and more particularly to a system and method for simulating a motion control system by using a mechanical modeler that includes interpolation functionality.

DESCRIPTION OF THE RELATED ART

Controlling physical systems using motion controllers has become increasingly popular in recent years. Accordingly, testing motion systems before they are actually made helps in making the design and testing phase more efficient and less costly. As a result, simulation of motion systems has become important. Simulating a motion system (e.g., a mechanical model of a machine with drives, motors and a motion controller) typically entails three parts:
1. Simulating the motion controller or using a real motion controller connected to a computer that simulates the other components of a motion system;
2. Simulating the electrical components, e.g., the drive/motor; and
3. Simulating the mechanical part; i.e. the mechanics of the machine/plant.

In most cases, especially in the initial design phase of a machine, the electrical components (drives and motors) are not important for simulation since the machine's functionality is still being determined. To ensure that that the motion profiles can solve the application and achieve the basic required functionality, it is typically sufficient to connect the motion controller directly to the model and run the motion profiles. However, current systems (e.g., CAD tools) are not set up to handle connecting a mechanical model directly to motion controllers without having a drive/motor simulator as an interface. In addition, the mechanical solvers need to run at much higher rates than the motion controllers to provide accurate results. Thus, improvements in simulation and testing of motion systems are desired.

SUMMARY OF THE INVENTION

Various embodiments are presented of a system and method for simulating a motion control system by using a mechanical modeler that includes interpolation functionality.

First position data may be received, e.g., by the mechanical modeler. The first position data may have been provided by a motion controller at a first rate. In one embodiment, the mechanical modeler may be software executed by a host computer. Additionally, the motion controller may also be software executed by the host computer. In one embodiment, the motion controller may be controlled by a graphical program which implements motion control functionality. The graphical program may include a plurality of interconnected nodes which visually indicate the motion control functionality of the graphical program. Thus, in one embodiment, the graphical program, the motion controller, and the mechanical modeler may be executed by the same computer to simulate a motion system. However, the execution may be divided among a plurality of computers, among other configurations, as desired. Alternatively, the motion controller may be implemented as a hardware motion controller (e.g., a card within the computer, a standalone motion controller, etc.).

The first position data may be interpolated to provide second position data at a second rate. Operation of the mechanical system may be modeled or simulated using the second position data at the second rate. Interpolating the first position data and modeling operation of the mechanical system may be performed without simulating drives and motors necessary to drive the mechanical system.

The interpolation function and/or modeling may be performed by the mechanical modeler as opposed to the motion controller. Thus, because the interpolation and modeling may be performed by the mechanical modeler, the motion controller may be configured to provide the first position data for a real or simulated mechanical system. In other words, the motion controller may not care or be aware that the mechanical system it is controlling is real or simulated. Similarly, the application controlling the motion controller may be tested without modification and during execution, the application may not be aware that the mechanical system is real or simulated. Thus, the functionality application controlling the motion controller may be tested without modification before actual hardware implementation of the motion system. Similarly, the mechanical system may be modeled and tested with the motion controller without having to implement the physical system (or just the mechanical system) and does not require simulation of the drives and motors which would normally interface between the motion controller and mechanical system.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 6,865,441 titled "Parallel Loops for Trajectory Generation, Spline Interpolation and Control for a Motion Control Application", issued on Mar. 8, 2005.

U.S. patent application Ser. No. 11/226,863, titled "Automatic Generation of a Motion Controller", filed on Sep. 14, 2005.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Graphical Data Flow Program (or Graphical Data Flow Diagram)—A graphical program or diagram comprising a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Figure 1:
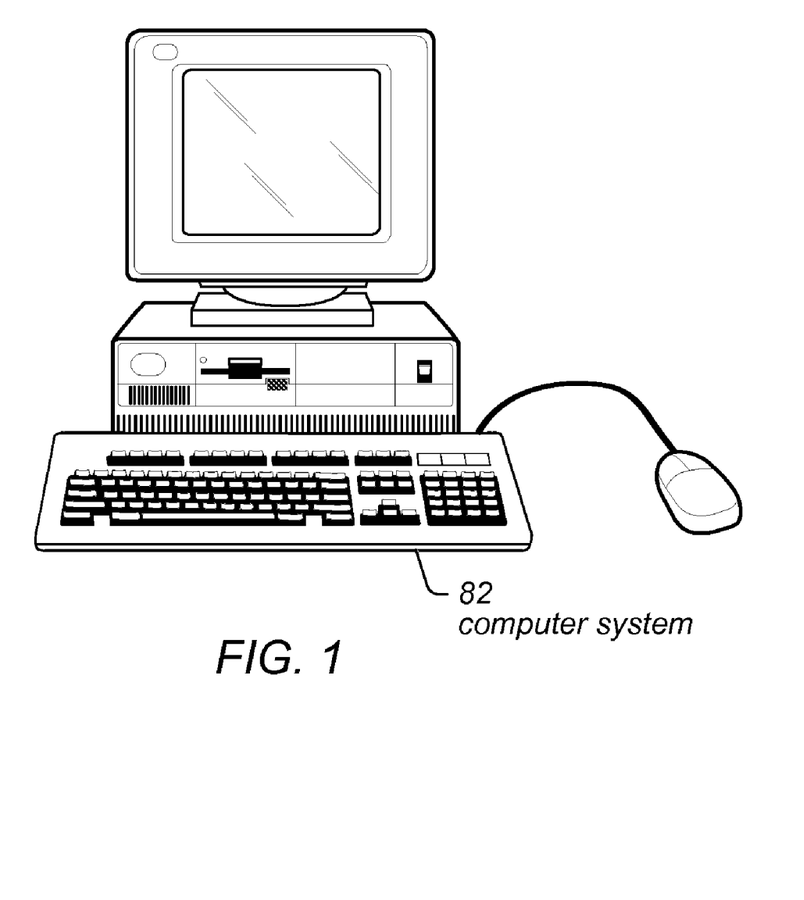
FIG. 1 illustrates a computer system, according to an embodiment.

FIG. 1—Computer System

FIG. 1 illustrates a computer system 82 operable to execute various motion system simulations and controllers, according to embodiments described below. For example, the computer system 82 may be operable to execute a motion controller, an application controlling the motion controller (e.g., a graphical program including a plurality of interconnected nodes which visually specify the functionality of the motion controller), and/or a mechanical modeler.

As shown in FIG. 1, the computer system 82 may include a display device operable to display the graphical program (e.g., corresponding to the motion controller) as the graphical program is created and/or executed. The display device may also be operable to display a graphical user interface or front panel of the graphical program during execution of the graphical program. The display may also provide an interface for the mechanical modeler and/or motion system simulator. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs, mechanical models, interpolators, etc. which are executable to perform the methods described herein. Additionally, the memory medium may store a graphical programming development environment application used to create and/or execute such graphical programs and possibly a modeling environment for creating the mechanical modeler. The memory medium may also store operating system software, as well as other software for operation of the computer system. The computer system 82 may be a platform that supports real time execution, e.g., a device including a processor that executes a real time operating system (RTOS), or a device including a programmable hardware element. Various embodiments further include receiving or storing instructions and/or data implemented in accordance with the foregoing description upon a carrier medium.

Figure 2:
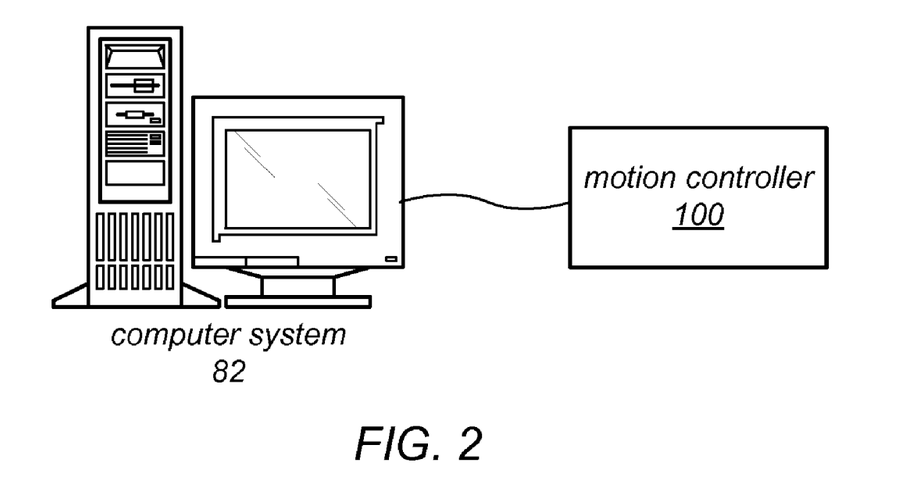
FIG. 2 illustrates the computer system coupled to a motion controller according to one embodiment.

FIG. 2—Exemplary Motion Controller and Computer System

FIG. 2 illustrates a motion controller 100 coupled to the computer system 82. In various embodiments, the motion controller 100 may be a stand alone hardware unit (e.g., with its own chassis), or may incorporated into a computer system. For example, in one embodiment, the motion controller may be a card that may be inserted in a computer system, e.g., the computer system 82. Thus, in various embodiments, the motion controller 100 may be included in the computer system 82 or may be coupled to the computer system 82 over various mediums and/or networks. As indicated above, the motion controller 100 may be configured according to a graphical program which visually specifies functionality of the motion controller 100. In some embodiments, the motion controller 100 may be an "off the shelf" motion controller that is controlled by the graphical program. Alternatively, or additionally, the motion controller may be compiled for execution with the graphical program, and thus the motion controller 100 may include both the graphical program and the motion controller engine.

The motion controller 100 may include a programmable hardware element, such as a field programmable gate array (FPGA) which may be configured according to the graphical program as described in U.S. Pat. No. 6,865,441 and U.S. patent application Ser. No. 11/226,863, which were incorporated by reference in their entirety above. Thus, in one embodiment, the graphical program of the motion controller 100 may be configured or created on the computer system 82 and targeted for implementation or execution by the motion controller 100.

In one embodiment, the motion controller may be configured to control a mechanical system. The mechanical system may be any of various mechanical, automation, or industrial systems. For example, the mechanical system may include various gears, shafts, belts, bearings, etc. that may be controlled in response to signals (e.g., position signals) transmitted by the motion controller 100. The mechanical system may be used for performing vision tasks (e.g., examining materials provided along a conveyer belt), manufacturing, etc. As indicated above, the mechanical system may be modeled by a mechanical modeler that is executed by the computer 82.

Figure 3A:
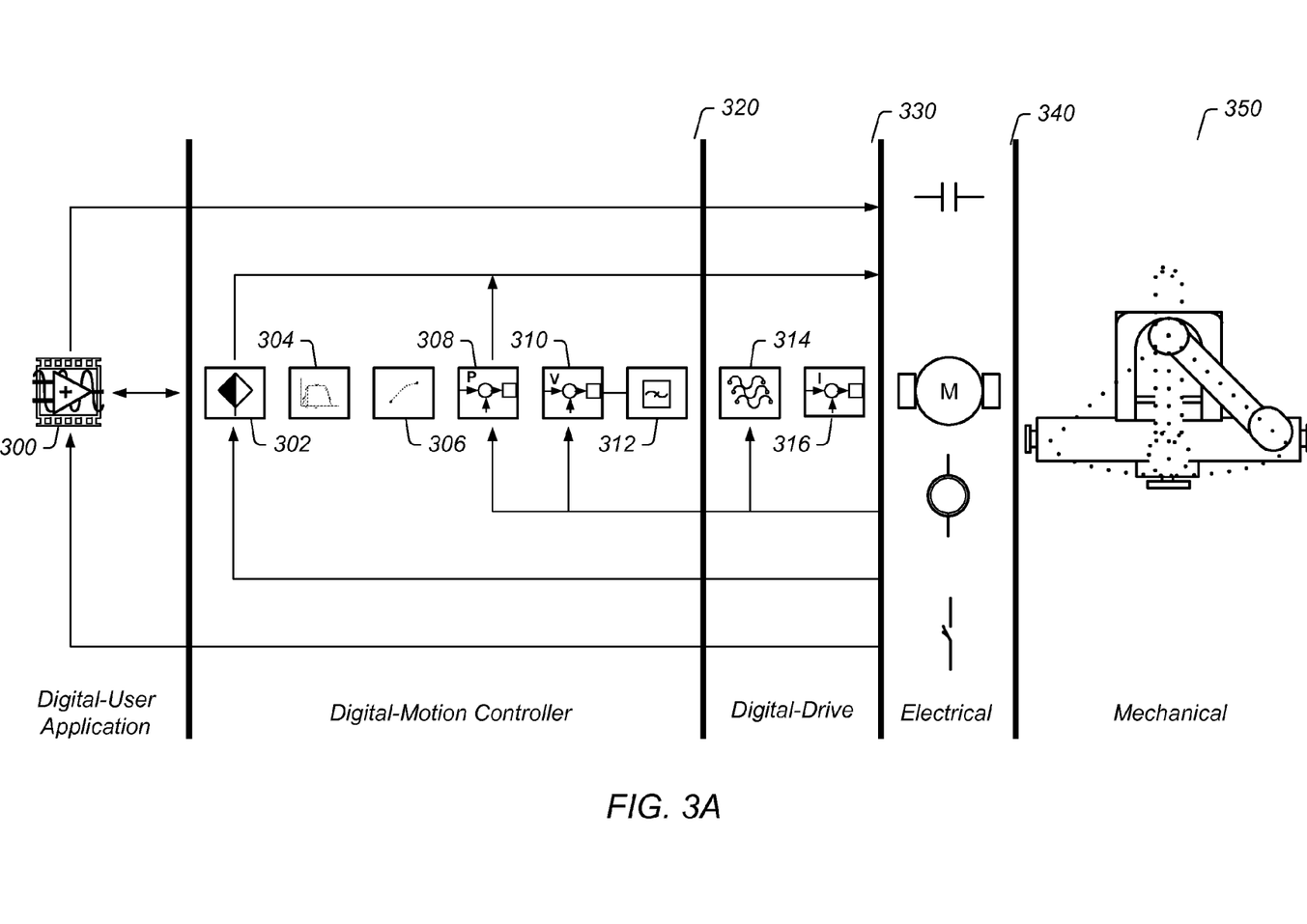
FIGS. 3A-3C illustrate exemplary simulated motion systems according to one embodiment.
Figure 3B:
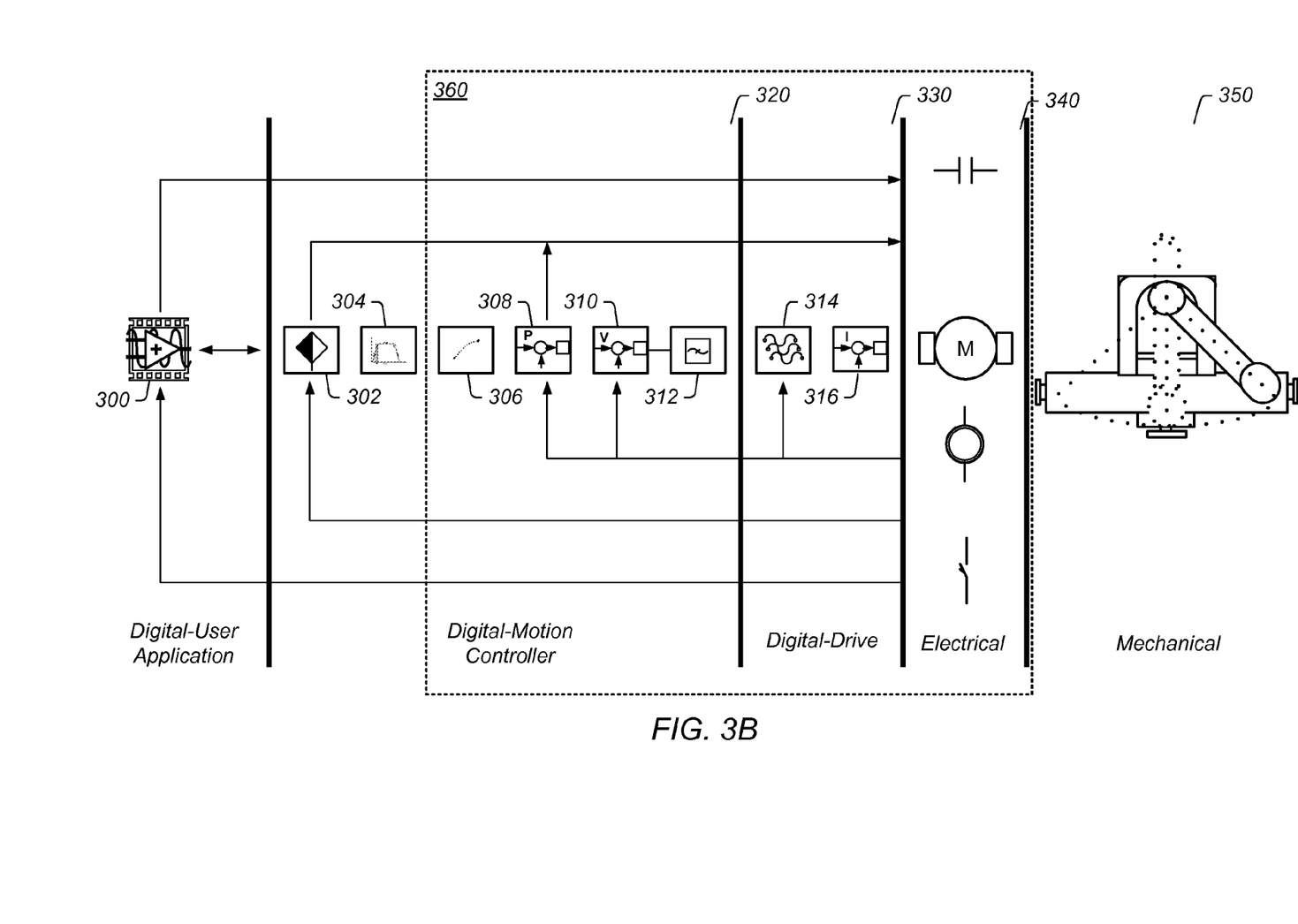
Figure 3C:
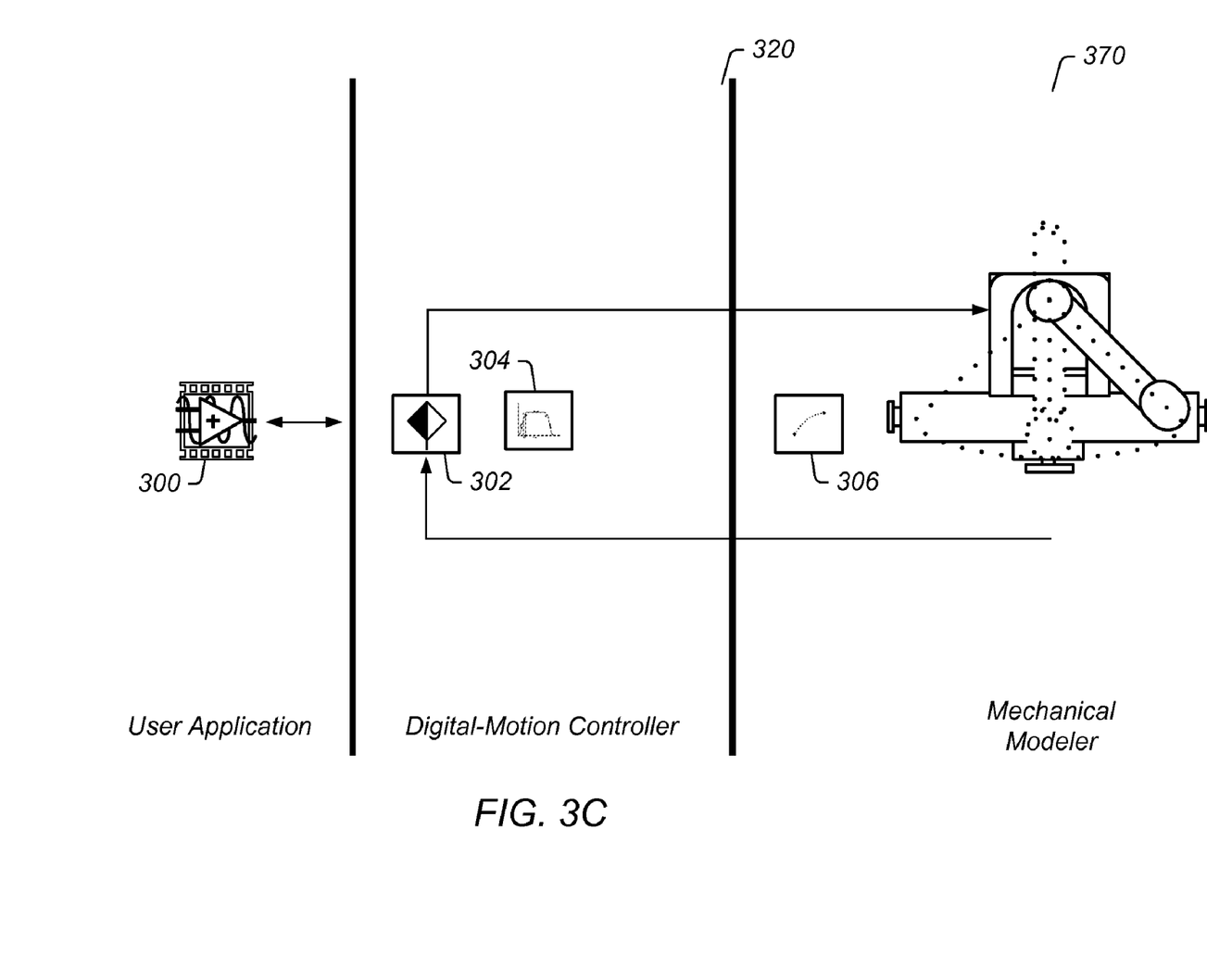

FIGS. 3A-3C—Exemplary Simulated Motion Systems

FIGS. 3A-3C illustrate exemplary motion systems that may be simulated according to various embodiments described herein.

In FIG. 3A, an exemplary motion control system is shown. As shown, the motion system may include motion controller 320, drive 330, motors and electrical components 340, and the mechanical portion 350. As shown, a digital user application 300 (e.g., a graphical program) may interface with the motion controller 320, e.g., for providing input which controls the motion controller 320. Although not shown in the Figure, the user application (e.g., the graphical program) may be implemented with the motion controller 320. Thus, in some embodiments, the motion controller 320 and the controlling application may form an integrated controlling engine or may be implemented on a same device (e.g., where the application and the control engine execute concurrently, possibly on different processors or threads of the same processor).

As shown, the motion controller 320 may include supervisory control 302, trajectory generator 304, interpolator 306, position loop 308, velocity loop 310, filters 312, commutation 314, and current loop 316. The supervisory control 302 may be responsible for API I/O reaction, trajectory generator control, gearing/camming, and/or position based synchronization. The supervisory control 302 may also interface with the user application 300 (which, as indicated above, may be a graphical program). For example, the user application 300 may provide signals for controlling the motion controller 320 via the supervisory control 302. The trajectory generator 304 may be responsible for profile generation, path planning, and/or coordinated motion. The interpolator 306 may generate intermediate positions if control loops run at a different (e.g., faster) rate than the trajectory generator. The position loop 308 may control the position and the velocity loop 310 may control the velocity. The filters 312 may remove resonances, the commutation 316 may control direction of the current, and the current loop 316 may control the current.

In order to simulate such a system, typically, each component of the system would have to be simulated. In this case, the motion controller 320 (as well as the user application 300) can be simulated without modification as it is normally implemented via software, and the mechanical system 350 may be accurately modeled using a mechanical modeler 370 (shown in FIG. 3C), e.g., using various CAD packages that are currently available. However, the equations of the drives 330 and motors 340 may need to be accurately determined based on the system motion system requirements.

To enable rapid prototyping and system validation, bypassing the drives 330 and motors 340 during simulation allows the motion controller 320 to be directly interfaced with the mechanical modeler which may simulate or model the mechanical system 350. FIG. 3B illustrates all of the components that may be bypassed (360) during simulation. Note that typical motion controllers can have various functions turned off (e.g., the velocity loop 310, the position loop 308, etc.) via simple configuration changes.

The resulting simulation system is shown in FIG. 3C. In order for the system of FIG. 3C to successfully operate, the mechanical modeler 370 (which models the mechanical system 350 above) may incorporate the interpolator 306 function described above. Thus, the interpolator 306 may run at the same rate as the mechanical modeler 370. It may consume the position data sent periodically from the motion controller 320 (which may only include the supervisory control 302 and the trajectory generator 304) and may create intermediate position data which the mechanical modeler 370 can use to simulate model movement appropriately.

Note that without moving the interpolator 306 to the mechanical modeler 370, the motion controller 320 would need to be modified to execute at two different rates: a first rate that creates the position data and a second rate that matches the rate of the mechanical solver to provide the interpolated position. Such a system would result in a motion controller 320 and controlling application 300 that would have to be modified for real use (with a real mechanical system and drives) and would also result in an overly complex motion controller, which is undesirable.

Thus, the mechanical modeler 370 including the interpolator 306 addresses both these problems. Thus, the motion controller 320 and mechanical model can be rapidly tested without modifying the user application 300 for the sole purpose of performing simulation. In other words, since the user application 300 is unmodified, it can be used for both simulation and for real world application (e.g., once the mechanical system, motors, and drives have been physically implemented).

Thus, the above described simulation system enables a motion controller's trajectory generator 304 to send position data directly to a mechanical modeler 370 (e.g., a CAD package executing a mechanical model solver) by using an interpolation technique built into the mechanical modeler 370. This creates an appearance to the motion controller (and correspondingly, the user application 300) that it is connected to a position based drive and hence it can continue to execute normally without any changes or modifications. The mechanical modeler 370 may use this interpolation functionality to solve the model equations at a much faster rate than the rate at which the motion controller 320 provides the positions, thereby achieving more accurate results. This way the drive/motor simulator becomes a non-requirement enabling easy setup and rapid prototyping ability for machine builders.

However, it should be noted that further testing may be necessary with the physical system, since the drive and motors typically cause lag or mechanical issues that may need to be addressed by the user application 300. Thus, ideal functionality of the mechanical system and controlling application may be tested by directly connecting the motion controller to the mechanical modeler of the mechanical system without dealing with intervening motor and electrical components shown in FIG. 3A.

Figure 4:
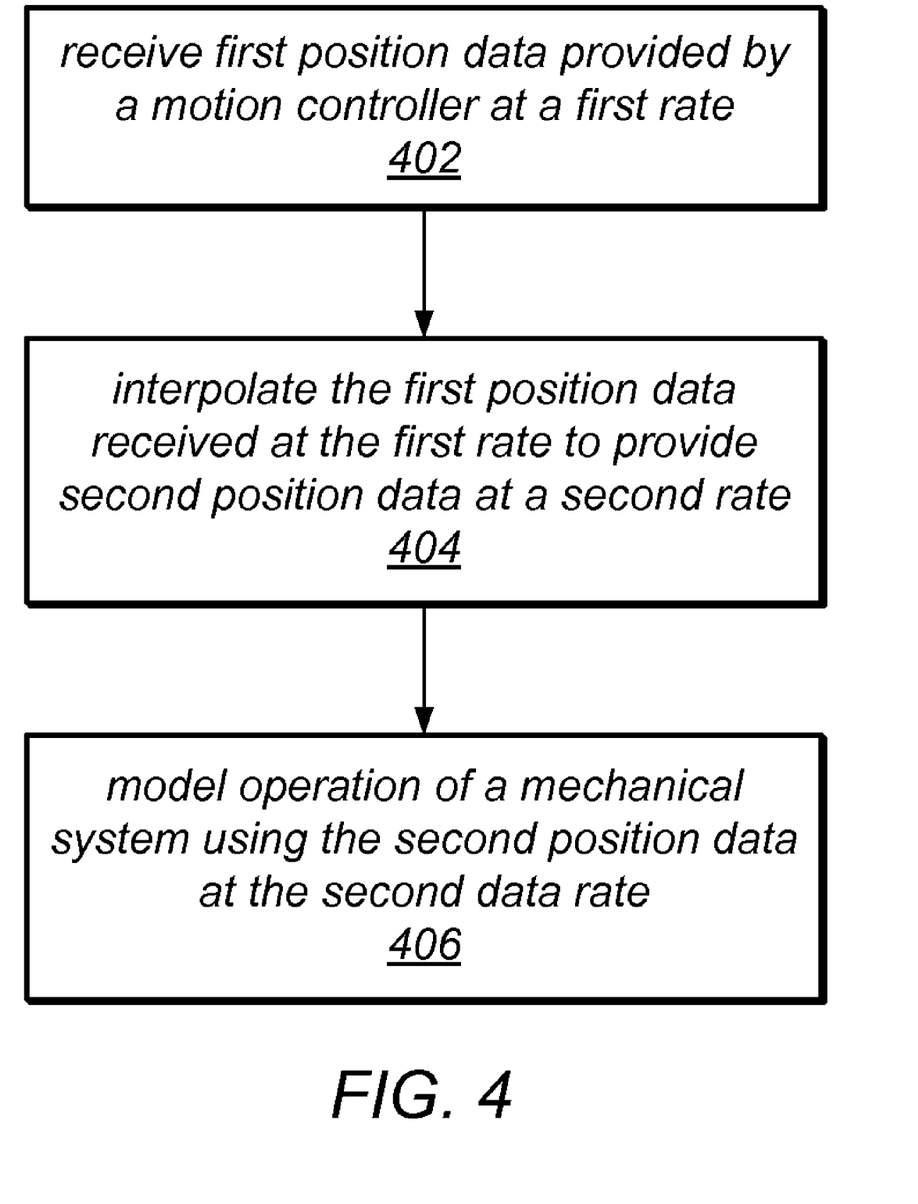
FIG. 4 is a flowchart diagram illustrating one embodiment of a method for simulating a motion system, according to one embodiment.

FIG. 4—Simulation of a Mechanical System Controlled by a Motion Controller

FIG. 4 illustrates a method for simulating a mechanical system controlled by a motion controller. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, first position data may be received. In some embodiments, the first position data may be received by a mechanical modeler that simulates a mechanical system. The first position data may be received from a motion controller and may be at a first rate (e.g., the rate of operation of the motion controller). Note that the position data may be received directly from the motion controller; in other words, there may not be any simulation of drives and motors which would be necessary to drive the mechanical system in the real world during simulation of the motion system.

The motion controller may be controlled by a user application or controlling application. The user application may be a graphical program which comprises a plurality of interconnected nodes which visually specifies functionality of the motion controller. The graphical program may be created according to various methods, e.g., manually, by the user assembling the various nodes and interconnected wires on a display, or automatically, e.g., in response to graphical program information, such as prototyping specifications. For example, the graphical program may be created by the user creating or specifying a prototype, followed by automatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein.

Thus, the method may include executing the controlling application, the motion controller, and the mechanical modeler. However, as indicated above, the controlling application and the motion controller may be integrated (or collocated) and any of various combinations may be used in terms of execution. For example, the controlling application and the motion controller may execute on a first computer system while the mechanical modeler executes on a second computer system. Other configurations are envisioned.

In 404, the first position data may be interpolated to provide second position data at a second rate (e.g., the rate of execution of the mechanical model).

In 406, operation of the mechanical system may be modeled or simulated using the second position data at the second rate. In other words, the mechanical modeler may use the position data at the second rate to model the mechanical system according to the control signals of the motion controller.

As indicated above, interpolating the first position data and modeling the operation of the mechanical system may be performed without simulating drives and motors necessary to drive the mechanical system. Additionally, the interpolation and modeling may be performed within the mechanical modeler (as opposed to the motion controller) thus alleviating various complications with the motion controller having to execute at two different rates (e.g., the rate of the controlling application and the rate of the mechanical modeler). Furthermore, this configuration may allow the motion controller and controlling application to be substantially unmodified for simulation purposes, as described herein.

Note that the controlling application and/or the motion controller may be unaware as to the nature of the mechanical system (e.g., whether it is being simulated by a mechanical modeler or if it is a real system). Thus, the controlling application and/or motion controller may be rapidly tested without requiring substantial modifications (or in some cases, any modifications) for simulation. More specifically, the controlling application may be unmodified and the motion controller may have various functions turned off that may normally be used for sending signals to the drives and motors that may not be simulated according to this method. Thus, interpolating and modeling may allow the application controlling the motion controller (as well as the designed mechanical system) without modification and before physically implementing the mechanical system.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium storing program instructions for simulating a mechanical system controlled by a motion controller, wherein the program instructions are executable by a processor to:

receive first position data provided by a motion controller at a first rate;

interpolate the first position data received at the first rate to provide second position data at a second rate;

model operation of the mechanical system using the second position data at the second rate;

wherein said interpolating the first position data and modeling operation of the mechanical system is performed without simulating drives and motors necessary to drive the mechanical system.

2. The non-transitory computer accessible memory medium of claim 1, wherein the program instructions are further executable to:

execute an application which causes the motion controller to provide the first position data.

3. The non-transitory computer accessible memory medium of claim 2, wherein the application comprises a graphical program, wherein the graphical program comprises a plurality of interconnected nodes which visually specify functionality of the motion controller.

4. The non-transitory computer accessible memory medium of claim 1, wherein the motion controller is configured to provide the first position data for a real or simulated mechanical system.

5. The non-transitory computer accessible memory medium of claim 1, wherein said interpolating and said modeling allows an application controlling the motion controller to be tested without modification before physically implementing the mechanical system.

6. The non-transitory computer accessible memory medium of claim 1, wherein said interpolating and said modeling allows for testing of an application controlling the motion controller and the mechanical system without physically implementing the mechanical system.

7. The non-transitory computer accessible memory medium of claim 1, wherein said interpolating and said modeling are performed by a mechanical modeler.

8. A method for simulating a mechanical system controlled by a motion controller, comprising:

utilizing a computer to perform:

receiving first position data provided by a motion controller at a first rate;

interpolating the first position data received at the first rate to provide second position data at a second rate;

modeling operation of the mechanical system using the second position data at the second rate;

wherein said interpolating the first position data and modeling operation of the mechanical system is performed without simulating drives and motors necessary to drive the mechanical system.

9. The method of claim 8, further comprising:

utilizing the computer for perform:

executing an application which causes the motion controller to provide the first position data.

10. The method of claim 8, wherein the application comprises a graphical program, wherein the graphical program comprises a plurality of interconnected nodes which visually specify functionality of the motion controller.

11. The method of claim 8, wherein the motion controller is configured to provide the first position data for a real or simulated mechanical system.

12. The method of claim 8, wherein said interpolating and said modeling allows an application controlling the motion controller to be tested without modification before physically implementing the mechanical system.

13. The method of claim 8, wherein said interpolating and said modeling allows for testing of an application controlling the motion controller and the mechanical system without physically implementing the mechanical system.

14. The method of claim 8, wherein said interpolating and said modeling are performed by a mechanical modeler.

15. A system, comprising:

a processor; and a memory medium coupled to the processor storing program instructions, wherein the program instructions are executable by the processor to:

receive first position data provided by a motion controller at a first rate;

interpolate the first position data received at the first rate to provide second position data at a second rate;

model operation of the mechanical system using the second position data at the second rate;

wherein said interpolating the first position data and modeling operation of the mechanical system is performed without simulating drives and motors necessary to drive the mechanical system.

16. The system of claim 15, wherein the program instructions are further executable to:

execute an application which causes the motion controller to provide the first position data.

17. The system of claim 16, wherein the application comprises a graphical program, wherein the graphical program comprises a plurality of interconnected nodes which visually specify functionality of the motion controller.

18. The system of claim 15, wherein the motion controller is configured to provide the first position data for a real or simulated mechanical system.

19. The system of claim 15, wherein said interpolating and said modeling allows an application controlling the motion controller to be tested without modification before physically implementing the mechanical system.

20. The system of claim 15, wherein said interpolating and said modeling allows for testing of an application controlling the motion controller and the mechanical system without physically implementing the mechanical system.

* * * * *